United States Patent [19]

Allen et al.

[11] 4,133,401

[45] Jan. 9, 1979

[54] VEHICLE SUSPENSION SYSTEM

[75] Inventors: Royce D. Allen, East Peoria; Eldon D. Oestmann, Morton, both of Ill.

[73] Assignee: Caterpillar Tractor Co., Peoria, Ill.

[21] Appl. No.: 796,567

[22] Filed: May 13, 1977

[51] Int. Cl.² .............................................. B62D 55/10
[52] U.S. Cl. ........................................ 180/9.5; 305/27
[58] Field of Search .................. 180/5 R, 9.48, 9.5, 180/9.52; 305/27; 308/72, 5, 9

[56] References Cited

U.S. PATENT DOCUMENTS

| | | | |
|---|---|---|---|
| 3,735,830 | 5/1973 | Talley | 180/9.5 |
| 3,980,149 | 9/1976 | Blomstrom | 180/9.5 |

*Primary Examiner*—Philip Goodman
*Attorney, Agent, or Firm*—Phillips, Moore, Weissenberger, Lempio & Majestic

[57] ABSTRACT

A suspension system for a track-type tractor includes a shaft disposed through apertures of unitary frame members adjacent opposite sides of the vehicle, with track frames pivotally mounted to extended ends of the shaft, the shaft being rotatable and movable axially relative to the frame members.

7 Claims, 2 Drawing Figures

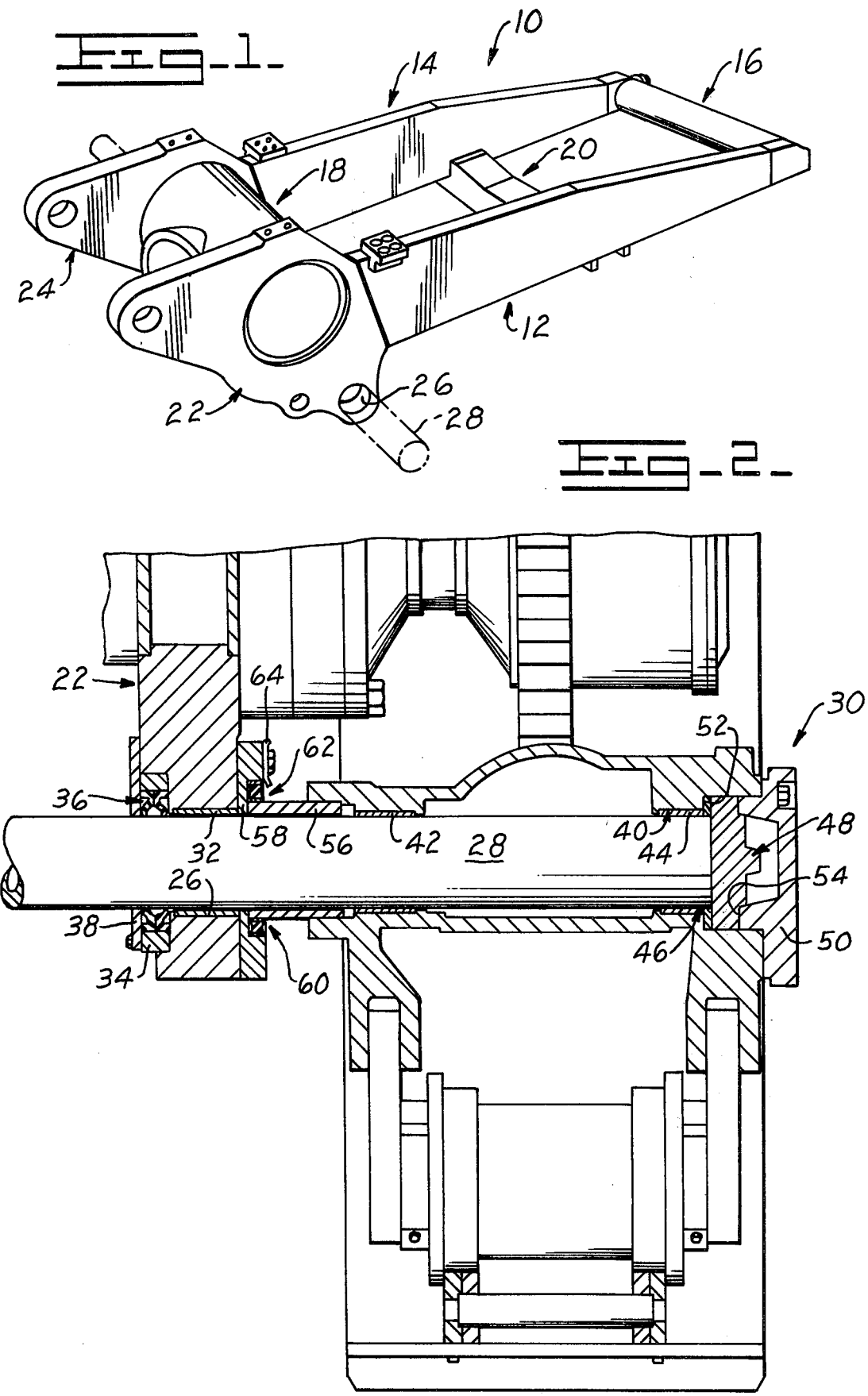

VEHICLE SUSPENSION SYSTEM

BACKGROUND OF THE INVENTION

This invention relates to vehicle suspension systems, and more particularly, to a suspension system for a track-type vehicle.

In general, it is well known to provide track roller frames on either side of a track-type vehicle, which are pivotally mounted to a shaft. In an effort to limit flexing of the shaft under loads placed thereon, the shaft has been secured to the main frame of the vehicle by means of caps bolted onto the main frame. It will be understood that very high loads are placed on the shaft, through loads placed on the track roller frames of the vehicle. In such a prior art system, the problem of breaking of such bolts has arisen, under conditions of extreme load and over a long period of operating time.

SUMMARY OF THE INVENTION

The present invention is directed to overcoming one or more of the problems as set forth above.

According to the present invention, a vehicle suspension system comprises a unitary frame member defining an aperture therethrough. A shaft is disposed through the aperture and is rotatable about its longitudinal axis within the aperture and movable along its longitudinal axis within the aperture. A track frame is pivotally mounted on the shaft.

BRIEF DESCRIPTION OF THE DRAWINGS

These and other objects of the invention will become apparent from a study of the following specification and drawings, in which:

FIG. 1 is a perspective view of the main frame of a vehicle, incorporating the invention; and FIG. 2 is a sectional view of a portion of the frame in asssociation with a track roller frame of the vehicle.

DESCRIPTION OF THE PREFERRED EMBODIMENT

Shown in FIG. 1 is a main frame 10 of a vehicle, including first and second lateral frame portions 12,14 connected by a front transverse frame portion 16, and a rear transverse frame portion 18. A saddle 20 is shown interconnecting the frame portions 12,14, for mounting of an equalizer bar thereto. The frame portions 12,14 each include unitary frame members 22,24, i.e., each being unitary in the sense that it is continuous in the area of and about apertures 26 (one shown) through which a shaft 28 may be positioned. That is, the shaft 28 may be placed in the apertures 26 only by introduction of and movement of the shaft 28 along its longitudinal axis, there being no caps and bolts which may be removed to provide other placement of the shaft 28 therein.

The detail of the unitary frame member 22 and shaft 28, along with a track frame 30, is shown in FIG. 2. As shown therein, the shaft 28 is disposed through the aperture 26 defined through the unitary frame member 22. In fact, a bushing 32 is press-fitted into such aperture 26, and the shaft 28 is disposed through the bushing 32. The inner diameter of the bushing 32 is sized in relation to the outer diameter of the shaft 28 such that a small annular gap is defined therebetween. This allows the shaft 28 to be rotatable about its longitudinal axis within the aperture 26 and within the bushing 32, and movable about its longitudinal axis within the aperture 26 and within the bushing 32.

A ring 34 is press-fitted into an annular channel defined by the frame member 22, and an annular seal 36 is positioned within such ring 34 and in contact therewith, and about the shaft 28 and in contact with the shaft 28. The seal 36 is retained in such position by a retaining plate 38 bolted to the ring 34.

The track roller frame 30 defines an internal passage 40 through which the shaft 28 is disposed. Bushings 42,44 are press-fitted into this passage 40, and the shaft 28 is disposed through the bushings 42,44. A small annular gap is defined between the inner surface of the bushing 42 and the outer surface of the shaft 28, and likewise, a small annular gap is defined between the inner surface of the bushing 44 and the outer surface of the shaft 28. This again allows for movement of the shaft 28 about its longitudinal axis relative to the track frame 30 and movement of the shaft 28 along its longitudinal axis relative to the track frame 30. The end 46 of the shaft has secured thereto a cap 48, and a retaining member 50 is fixed to the track frame 30, respective surfaces 52,54 of the track frame 30 and retaining member 50 acting on opposite sides of the cap 48 to limit sideward movement of the track frame 30 relative to the shaft 28. However, it will be understood that the surfaces 52,54 are spaced apart sufficiently to allow a small degree of such relative movement.

A sleeve 56 is press-fitted a bore in the passage 40, and is disposed about the shaft 28 between the track frame 30 and the frame member 22. The inner surface of the sleeve 56 is spaced from the outer surface of the shaft 28. An annular force-transferring member 58 is disposed in an annular channel defined by the frame member 22 about the shaft 28, and is disposed between the sleeve 56 and frame member 22, so as to be positioned to be contacted by the sleeve 56 upon sufficient leftward lateral movement of the track frame 30 (FIG. 2), to transfer lateral force on the track frame 30 to the main frame 22. Such sleeve 56 and force-transferring member 58 thus act as thrust bearing means 60 for transferring lateral force placed on the track frame 30 in the general direction of the frame member 22 to such frame member 22.

An annular seal 62 is also disposed in such channel, about and in contact with the sleeve 56 and in contact with a surface of the frame member 22. A retainer 64 is bolted to the frame member 22 to retain the seal 62 and force transferring member 58 in place.

It is to be understood that the association of the frame member 24, shaft 28, and opposite track frame are a mirror image of the apparatus shown in FIG. 2. Thus, if a high lateral load is placed on the track frame 30 tending to move the track frame 30 rightwardly, as shown in FIG. 2, surface 52 will bear against the cap 48, moving the shaft 28 slightly rightward to bring the corresponding sleeve of the opposite thrust bearing means into contact with the corresponding force-transferring member, providing that such lateral load placed on the track frame 30 rightwardly in FIG. 2 is transferred to the other frame member 24.

Because of the gaps described above between the shaft 28 and the respective bushings, sideward movement of the shaft relative to the frame members 22,24, and of the track frames relative to the shaft 28, are allowed, so as to avoid any problem of shaft scuffing, which might arrive due to side loading of track frames.

It should also be noted that, in contrast to the prior art system described above, the present system allows for a degree of shaft flexing without any possibility of damaging the means operatively associating the shaft 28 and frame members 22,24, the shaft 28 itself, or the frame members 22,24 themselves.

The embodiments of the invention in which an exclusive property or privilege is claimed are defined as follows:

1. A vehicle suspension system comprising:
 a unitary frame member including a pair of laterally spaced frame portions each defining an aperture therethrough;
 a shaft extending through said apertures,
 means providing annular clearances between said shaft and said frame portions whereat said apertures are defined for permitting said shaft to rotate about its longitudinal axis within the apertures and to also move along it longitudinal axis within the apertures whereby said shaft is mounted with freedom of universal movement relative to said frame member; and
 a track frame pivotally mounted on each end of the shaft.

2. The suspension system of claim 1 further comprising bushing means disposed within each said aperture and having said shaft movably disposed therein by a respective one of said clearances.

3. The suspension system of claim 2 further comprising thrust bearing means operatively associated with each track frame and frame member for transferring lateral forces imposed on the track frame in the general direction of the frame member to said frame member.

4. The suspension system of claim 3 further comprising seal means disposed on either side of each of said frame portions and the shaft for sealing said bushing means.

5. The suspension system of claim 3 wherein the thrust bearing means comprise a sleeve mounted on the track frame and disposed about the shaft and a force-transferring member disposed between the sleeve and frame member and further disposed about the shaft.

6. The suspension system of claim 3 further comprising additional bushing means mounted within a passage of the track frame and through which the shaft is disposed, the track frame being pivotable about the longitudinal axis of the shaft.

7. A vehicle suspension system comprising:
 a unitary frame member defining an aperture therethrough;
 a shaft disposed through said aperture and rotatable about its longitudinal axis within the aperture and movable along its longitudinal axis within the aperture;
 a track frame pivotally mounted on the shaft;
 bushing means disposed within said aperture and having said shaft movably disposed therein; and
 thrust bearing means operatively associated with the track frame and frame member for transferring lateral forces imposed on the track frame in the general direction of the frame member to said frame member, said thrust bearing means comprising a sleeve mounted on the track frame and disposed about the shaft and a force-transferring member disposed between the sleeve and the frame member and further disposed about the shaft.

* * * * *